United States Patent
Berger et al.

(10) Patent No.: US 11,397,253 B2
(45) Date of Patent: *Jul. 26, 2022

(54) LIDAR SENSOR ASSEMBLY CALIBRATION BASED ON REFERENCE SURFACE

(71) Applicant: Zoox, Inc., Foster City, CA (US)

(72) Inventors: Adam Berger, Mountain View, CA (US); Riley Andrews, San Francisco, CA (US); Ryan McMichael, Mountain View, CA (US); Denis Nikitin, Campbell, CA (US); Brian Alexander Pesch, Menlo Park, CA (US); Brian Pilnick, East Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/518,903

(22) Filed: Jul. 22, 2019

(65) Prior Publication Data

US 2019/0339368 A1 Nov. 7, 2019

Related U.S. Application Data

(63) Continuation of application No. 15/487,363, filed on Apr. 13, 2017, now Pat. No. 10,359,507.

(Continued)

(51) Int. Cl.
   *G01S 7/497* (2006.01)
   *G01S 17/42* (2006.01)
   (Continued)

(52) U.S. Cl.
   CPC ............. *G01S 7/497* (2013.01); *G01S 17/10* (2013.01); *G01S 17/42* (2013.01); *G01S 17/931* (2020.01)

(58) Field of Classification Search
   CPC .......... G01S 7/497; G01S 17/42; G01S 17/10; G01S 17/931
   See application file for complete search history.

(56) References Cited

U.S. PATENT DOCUMENTS

| 3,790,277 A | 2/1974 | Hogan |
| 4,154,529 A | 5/1979 | Dyott |

(Continued)

FOREIGN PATENT DOCUMENTS

| DE | 102011011875 B3 | 7/2012 |
| DE | 102014105261 B3 | 2/2015 |

(Continued)

OTHER PUBLICATIONS

U.S. Appl. No. 14/462,075, filed Aug. 18, 2014, Pennecot et al., "Devices and Methods for a Rotating LIDAR Platform with a Shared Transmit/Receive Path," 55 pages.

(Continued)

*Primary Examiner* — Rufus L Phillips
(74) *Attorney, Agent, or Firm* — Lee & Hayes, P.C.

(57) ABSTRACT

A LIDAR system includes one or more LIDAR sensor assemblies, which may be mounted to a vehicle or other object. Each LIDAR sensor assembly includes a laser light source to emit laser light, and a light sensor to produce a light signal in response to sensing reflected light corresponding to reflection of the laser light emitted by the laser light source from a reference surface that is fixed in relation to the LIDAR sensor assembly. A controller of the LIDAR sensor assembly may calibrate the LIDAR sensor assembly based at least in part on a signal from the light sensor indicating detection of reflected light corresponding to reflection of a pulse of laser light reflected from the reference surface.

20 Claims, 8 Drawing Sheets

Related U.S. Application Data

(60) Provisional application No. 62/440,761, filed on Dec. 30, 2016.

(51) Int. Cl.
*G01S 17/931* (2020.01)
*G01S 17/10* (2020.01)

(56) References Cited

U.S. PATENT DOCUMENTS

| | | |
|---|---|---|
| 4,516,158 A | 5/1985 | Grainge et al. |
| 4,700,301 A | 10/1987 | Dyke |
| 4,709,195 A | 11/1987 | Hellekson et al. |
| 5,098,185 A | 3/1992 | Watanabe et al. |
| 5,202,742 A | 4/1993 | Frank et al. |
| 5,303,084 A | 4/1994 | Pflibsen et al. |
| 5,337,189 A | 8/1994 | Krawczyk et al. |
| 5,428,438 A | 6/1995 | Komine |
| 5,703,351 A | 12/1997 | Meyers |
| 5,949,530 A | 9/1999 | Wetteborn |
| 6,046,800 A | 4/2000 | Ohtomo et al. |
| 6,115,128 A | 9/2000 | Vann |
| 6,778,732 B1 | 8/2004 | Fermann |
| 7,089,114 B1 | 8/2006 | Huang |
| 7,248,342 B1 | 7/2007 | Degnan |
| 7,255,275 B2 | 8/2007 | Gurevich et al. |
| 7,259,838 B2 | 8/2007 | Carlhoff et al. |
| 7,311,000 B2 | 12/2007 | Smith et al. |
| 7,323,670 B2 | 1/2008 | Walsh et al. |
| 7,361,948 B2 | 4/2008 | Hirano et al. |
| 7,417,716 B2 | 8/2008 | Nagasaka et al. |
| 7,544,945 B2 | 6/2009 | Tan et al. |
| 7,969,558 B2 | 6/2011 | Hall |
| 8,050,863 B2 | 11/2011 | Trepagnier et al. |
| 8,368,876 B1* | 2/2013 | Johnson .................. G01S 17/89 356/5.01 |
| 8,477,290 B2 | 7/2013 | Yamada |
| 8,638,446 B2* | 1/2014 | Briggs ...................... G01S 7/51 356/603 |
| 8,675,181 B2 | 3/2014 | Hall |
| 8,742,325 B1 | 6/2014 | Droz et al. |
| 8,767,190 B2 | 7/2014 | Hall |
| 8,836,922 B1 | 9/2014 | Pennecot et al. |
| 8,838,322 B1 | 9/2014 | Zhu et al. |
| 9,086,273 B1 | 7/2015 | Gruver et al. |
| 9,285,464 B2 | 3/2016 | Pennecot et al. |
| 9,368,936 B1 | 6/2016 | Lenius et al. |
| RE46,672 E | 1/2018 | Hall |
| 2002/0140924 A1 | 10/2002 | Wangler et al. |
| 2004/0136012 A1 | 7/2004 | Kyle et al. |
| 2005/0219530 A1* | 10/2005 | Horibe .................... G01S 17/86 356/399 |
| 2006/0131486 A1* | 6/2006 | Land ...................... G01S 7/4817 250/221 |
| 2008/0106724 A1* | 5/2008 | Braune .................... G01S 7/497 356/4.02 |
| 2008/0210881 A1* | 9/2008 | Harris ..................... G01S 17/95 250/393 |
| 2008/0316463 A1 | 12/2008 | Okada et al. |
| 2010/0076710 A1* | 3/2010 | Hukkeri .................. G01S 7/497 702/97 |
| 2010/0208235 A1* | 8/2010 | Kaehler ................. G01S 7/4817 356/5.01 |
| 2010/0220141 A1 | 9/2010 | Ozawa |
| 2010/0245849 A1 | 9/2010 | Satzky et al. |
| 2010/0302528 A1 | 12/2010 | Hall |
| 2011/0097014 A1* | 4/2011 | Lin ........................ G01S 17/86 382/284 |
| 2011/0216304 A1 | 9/2011 | Hall |
| 2011/0255070 A1 | 10/2011 | Phillips et al. |
| 2012/0126152 A1 | 5/2012 | Klein et al. |
| 2012/0271445 A1* | 10/2012 | Li ........................... C03C 25/12 700/103 |
| 2013/0148096 A1 | 6/2013 | Chang et al. |
| 2013/0258340 A1 | 10/2013 | Trummer et al. |
| 2014/0211194 A1 | 7/2014 | Pacala |
| 2015/0049326 A1* | 2/2015 | Lundquist ............... G01S 17/89 356/5.01 |
| 2015/0057851 A1* | 2/2015 | Turner .................... E01B 27/02 701/19 |
| 2015/0288955 A1 | 10/2015 | Perry et al. |
| 2015/0293228 A1 | 10/2015 | Retterath et al. |
| 2016/0047901 A1 | 2/2016 | Pacala et al. |
| 2016/0109616 A1 | 4/2016 | Hammes |
| 2018/0188361 A1 | 7/2018 | Berger et al. |

FOREIGN PATENT DOCUMENTS

| | | |
|---|---|---|
| EP | 2410358 A1 | 1/2012 |
| JP | H1020035 A | 1/1998 |
| JP | 2002098763 A | 4/2002 |
| JP | 2008070159 A | 3/2008 |
| JP | 2011075287 A | 4/2011 |
| JP | 2015148605 A | 8/2015 |
| JP | 2015203697 A | 11/2015 |
| WO | WO03073123 A1 | 9/2003 |
| WO | WO2012172526 A1 | 12/2012 |

OTHER PUBLICATIONS

Efficient Power Conversion, "Why GaN circuits make better Lidar," retrieved on Mar. 3, 2017 at <<http://epc-co.com/epc/DesignSupport/TrainingVideos/eGaNDemos/GaN-circuits-make-better-LiDAR.aspx>> 2 pages.

Notice of Allowance from the U.S. Patent and Trademark Office for U.S. Appl. No. 14/462,075, dated Nov. 18, 2015, 8 pages.

Final Office Action dated Jan. 2, 2019 for U.S. Appl. No. 15/487,363 "Lidar Sensor Assembly Calibration Based On Reference Surface," Berger, 16 pages.

Office Action from the U.S. Patent and Trademark Office for U.S. Appl. No. 14/462,075, dated Jun. 17, 2015, 14 pages.

Office action for U.S. Appl. No. 15/487,363, dated Jun. 27, 2018, Berger, "Lidar Sensor Assembly Calibration Based on Reference Surface," 13 pages.

The PCT Invitation to Pay Additional Fees dated Mar. 26, 2018 for PCT application No. PCT/US2017/068286, 14 pages.

The PCT Search Report and Written Opinion dated May 25, 2018 for PCT application No. PCT/US2017/068286, 20 pages.

The PCT Search Report and Written Opinion dated Nov. 19, 2014 for PCT Application No. PCT/US2014/047864, 12 pages.

Rim et al., "The optical advantages of curved focal plane arrays," Optics Express, vol. 16, No. 7, Mar. 31, 2008, 1 page.

Xu et al., "A calibration method of the multi-channel imaging lidar," Proceedings SPIE 9080, Laser Radar Technology and Applications XIX; and Atmospheric Propagation XI, 90800V, Jun. 9, 2014, 2 pages.

The European Office Action dated Jul. 30, 2020 for European Patent Application No. 17829895.6, a counterpart of U.S. Pat. No. 10,359,507, 5 pages.

Japanese Office Action dated Sep. 14, 2021 for Japanese Patent Application No. 2019-556544, a foreign counterpart to U.S. Pat. No. 10,359,507, 27 pages.

* cited by examiner

LIDAR SENSOR ASSEMBLY CALIBRATION BASED ON REFERENCE SURFACE

RELATED APPLICATIONS

This application is a continuation of and claims priority to U.S. patent application Ser. No. 15/487,363, filed on Apr. 13, 2017, the disclosure of which claims priority to U.S. Provisional Application No. 62/440,761, filed Dec. 30, 2016, both of which are incorporated herein by reference.

BACKGROUND

The term "LIDAR" refers to a technique for measuring distances to visible objects by emitting light and measuring properties of the reflections of the light. A LIDAR system has a light emitter and a light sensor. The light emitter may comprise a laser that directs highly focused light toward an object which then reflects the light back to the light sensor. The light sensor may comprise a photodetector such as a photomultiplier or avalanche photodiode (APD) that converts light intensity to a corresponding electrical signal. Optical components such as lenses may be used in the light transmission and reception paths to focus light, depending on the particular nature of the LIDAR system.

A LIDAR system has signal processing components that analyze reflected light signals to determine the distances to surfaces from which the emitted laser light has been reflected. For example, the system may measure the "time of flight" of a light signal as it travels from the laser, to the surface, and back to the light sensor. A distance is then calculated based on the known speed of light. However, the accuracy of the distance measurement may depend on performance characteristics of the components of the LIDAR system (e.g., power sources, light sources, light sensors, etc.). Additionally, changes in environmental conditions, such as temperature and/or humidity, may impact distance measurements over time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
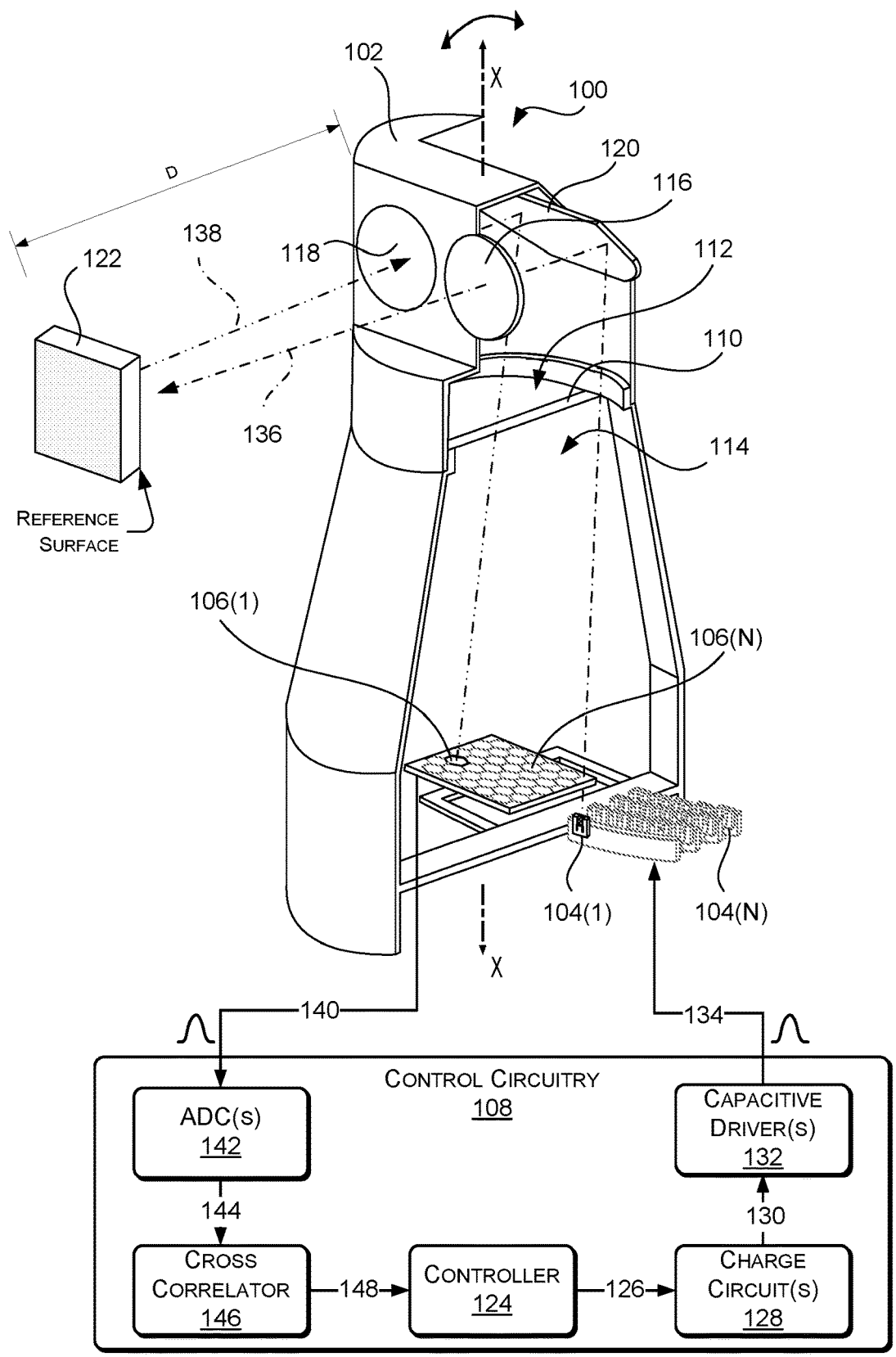
FIG. 1 is a partial cut away view showing an example LIDAR sensor assembly that can be calibrated using a reference surface that is fixed relative to the LIDAR sensor assembly.

Typical LIDAR systems emit a light pulse and detect reflected light corresponding to the light pulse reflected off an object in the environment. The reflected light signals are then analyzed to determine the distances from the LIDAR system to surfaces from which the emitted laser light has been reflected. For example, the system may measure the "time of flight" (TOF) of a light signal as it travels from the laser, to the object, and back to the light sensor. A distance is then calculated based on the measured time of flight and the known speed of light. However, existing LIDAR systems do not do not take into account performance characteristics of the components of the LIDAR systems.

For example, these known techniques assume that the light source emits the light pulse substantially instantaneously when it is instructed to fire. However, in practice, the light pulse is not emitted instantaneously. Instead, there is some latency inherent in the components of the LIDAR system. Moreover, the light pulse may be Gaussian in nature, ramping up over time to a peak before dropping back off. Thus, the actual time of flight of the light pulse is a time from a peak of the emitted light pulse to a peak of the return pulse. However, because a time corresponding to the peak of the emitted light pulse may not be known, existing LIDAR systems use as a proxy the time at which the light source is instructed to fire. Thus, existing LIDAR systems do not account for inaccuracies in distance measurements inherently caused by performance characteristics and limitations of the components of the LIDAR systems. Furthermore, existing LIDAR systems do not account for differences in performance characteristics between similar components of the LIDAR system (e.g., differences in characteristics between multiple different light sources within the LIDAR system). Existing LIDAR systems also do not account for changes in performance characteristics over time, such as changes caused by environmental conditions in which the LIDAR systems are operating.

This application describes techniques for calibrating a LIDAR system based on a reference surface that is fixed at a known distance from a LIDAR sensor assembly. By using a fixed reference surface that is a known distance from the LIDAR sensor assembly, the LIDAR sensor assembly is able accurately measure a time of the peak of the emitted light pulse. In some examples this can be done directly by calculating an expected time of flight of a light pulse to the reference surface and back to the LIDAR sensor assembly. From this expected time of flight, the LIDAR sensor assembly can accurately determine a latency from the instruction to fire the light source to the peak of the emitted light pulse that is attributable to the performance characteristics of the components of the LIDAR sensor assembly. In other examples, due to the relatively short distance to the reference surface (typically a few centimeters or less), the time of flight of the light pulse to the reference surface may be negligible, and the LIDAR sensor assembly may determine the latency to be a time from the signal to fire the light source to receipt of the peak return signal.

Regardless of the technique used to determine the latency, the LIDAR sensor assembly can be calibrated to account for the latency, thereby improving the accuracy of subsequent distance measurements. In the case of multi-channel LIDAR systems, these calibration techniques can be performed for each channel (e.g., light source and light sensor combination) of the LIDAR sensor assembly. Moreover, in some examples, these techniques can be applied at runtime to account for changes in performance characteristics over time, such as changes caused by environmental conditions in which the LIDAR sensor assembly is operating. Still further, in some examples, the intensity of the reflected light returned from the reference surface may be measured and compared to previous returns to detect changes in performance of the light sources (e.g., determine degradation, burnout, or malfunction of a light source, storage capacity of a capacitor or other power source, or the like).

In some examples, a LIDAR sensor assembly usable to implement the techniques described herein includes a rotatable assembly including one or more light sources, one or more light sensors, and associated circuitry mounted in a chassis that rotates about a vertical rotational axis to scan horizontally across a scene. During a rotation of the chassis, light pulses are emitted at different horizontal directions. The horizontal angle of light emission varies with the rotation of the chassis. In other examples, LIDAR sensor assemblies according to this disclosure may be mounted in different orientations (e.g., may rotate about an axis other than a vertical axis such that the LIDAR sensor assembly scans in a path other than horizontal). In some examples, a view of the LIDAR sensor assembly may be limited or partially obstructed by an opaque object (e.g., by a stationary portion of the LIDAR sensor assembly, a vehicle to which the LIDAR sensor assembly is mounted, etc.). In that case, the LIDAR sensor assembly may be said to have a "limited detection angle" of less than 360 degrees. The obstruction may include a reference surface that is fixed relative to an axis of rotation of the rotatable assembly. Thus, the reference surface is positioned at a known, fixed distance from the light sources and light sensors of the LIDAR sensor assembly and may be used to calibrate the LIDAR sensor assembly. In other examples, the LIDAR sensor assembly may have an unobstructed 360-degree detection angle.

In either case (limited detection angle or unobstructed detection angle), the LIDAR sensor assembly may additionally or alternatively include a substantially transparent surface (e.g., a cover or lens surrounding the rotatable assembly). The substantially transparent surface may be coupled to a stationary portion of the LIDAR sensor assembly and may be fixed at a known distance from the axis of rotation of the rotatable assembly. The substantially transparent surface may reflect a portion of the light emitted by the light source and may, therefore, additionally or alternatively serve as a fixed reference surface from which to calibrate the LIDAR sensor assembly.

In some examples, the calibration may be performed by a controller of the LIDAR sensor assembly as follows. The controller may cause the light source to emit a pulse of light toward the fixed reference surface. The controller then receives a signal from the light sensor indicating detection of reflected light corresponding to reflection of the pulse of light from the fixed reference surface. The controller may calibrate the LIDAR sensor assembly based at least in part on the signal indicating detection of the reflected light corresponding to reflection of the pulse of laser light from the fixed reference surface.

In this way, the LIDAR sensor assembly can be calibrated to account for latency inherent in the performance characteristics of the light sources, light sensors, and associated circuitry, thereby improving the accuracy of subsequent distance measurements. In the case of multi-channel LIDAR systems, each channel (e.g., light source and light sensor combination) may be calibrated. This calibration can be performed when the LIDAR system is turned on and/or periodically during use to account for changes in performance characteristics over time, such as changes caused by environmental conditions in which the LIDAR sensor assembly is operating.

These and other aspects are described further below with reference to the accompanying drawings. The drawings are merely example implementations, and should not be construed to limit the scope of the claims. For example, while the drawings depict a LIDAR sensor assembly including a specific number of channels, the techniques described herein are also applicable to LIDAR sensor assemblies using different numbers of channels. Also, while in some examples the LIDAR sensor assembly is described as being mounted to a vehicle, in other examples LIDAR sensor assemblies according to this disclosure may be used in other scenarios, such as in a manufacturing line, in a security context, or the like.

Example LIDAR Sensor Assembly

FIG. 1 is a partial cutaway view of an example system including a LIDAR sensor assembly 100. The LIDAR sensor assembly 100 includes a chassis 102 that comprises multiple laser light source(s) 104(1)-104(N) (collectively referred to as "laser light sources 104) and one or more light sensor(s) 106(1)-106(N) (collectively referred to as "light sensors 106"), where N is any integer greater than or equal to 1. The LIDAR sensor assembly 100 also includes control circuitry 108 configured to control emission of light by the light sources and to receive and analyze signals from the light sensors 106.

In some examples, the chassis 102 may include a partition 110 (shown as transparent for ease and clarity of installation) that forms a compartment on each of two lateral sides of the chassis 102. In FIG. 1, a sensor compartment 112 is shown on one side of the chassis 102 and an emitter compartment 114 is shown on the other side of the chassis 102. The sensor compartment 112 houses the light sensor(s) 106 and the emitter compartment 114 houses the laser light source(s) 104 while the partition 110 may be opaque to prevent or limit light leakage therebetween.

In the illustrated example, the chassis 102 also supports a first lens 116 and a second lens 118, which may each be mounted so that their optical axes are oriented generally perpendicular to an outer surface of the chassis 102. The first lens 116 is generally above the emitter compartment 114 and forward of the laser light source(s) 104. In some examples, one or more mirrors 120 are positioned within the chassis 102 behind the first lens 116 and second lens 118 to redirect emitted and received light between horizontal and vertical directions. The chassis 102 may be rotatable about an axis of rotation X, such that as the chassis 102 is rotated, the optical axes of the first lens 116 and the second lens 118 will scan horizontally across a scene including one or more objects including an object 122.

In some examples, the LIDAR assembly 100 may include a plurality of channels by which a laser light sources 104 may emit light along a precise direction so that the reflected light strikes a light sensor that corresponds specifically to the laser light source 104. For example, laser light source 104(1) and light sensor 106(1) may correspond specifically to a first channel whereas laser light source 104(N) and light sensor 106(N) may correspond specifically to an N-th channel. The optical system of the LIDAR sensor assembly 100 is designed so that beams from light sources 104 at different physical positions within the LIDAR sensor assembly 100 are directed outwardly at different angles in azimuth and elevation. Specifically, the first lens 116 is designed to direct light from the light sources 104 for at least some of the channels at different angles relative to the horizon. The first lens 116 is designed so that the corresponding light sensor 106 of the channel receives reflected light from the same direction.

The control circuitry 108 includes a controller 124 that implements control and analysis logic. The controller 124 may be implemented in part by an FPGA (field-programmable gate array), a microprocessor, a DSP (digital signal processor), or a combination of one or more of these and other control and processing elements, and may have associated memory for storing associated programs and data.

The controller 124 implements control and analysis logic for each of the multiple channels. To initiate a single distance measurement using a single channel, the controller 124 generates a signal 126. The signal 126 is received by a charge circuit 128, which determines an appropriate charge duration (e.g., based on desired intensity, pulse width, etc.) and provides signal 130 to charge a capacitive driver 132 for the specified charge duration. The capacitive driver 132 comprises a bank of one or more capacitors to drive the light sources 104. The duration of charge determines the intensity of the light pulse emitted for by the light source 104.

After charging for the specified duration, the controller 124 causes the capacitive driver 132 to output an emitter drive signal 134 to the respective light source 104. The emitter drive signal 134 causes the respective light source (e.g., light source 104(1) in this example) to light source 104 to emit one or more laser light pulses through the first lens 116 along an outward path 136 (shown by the dot-dash line). The burst is reflected by the object 122 in the scene, through the lens second 118, and to the light sensor 106 of the corresponding channel (e.g., light sensor 106(1) in this example) along a return path 138 (shown by the double-dot-dash line).

Upon receipt of the reflected light along return path 138, the light sensor 106(1) outputs a return signal 140 to an analog to digital converter (ADC) 142. The return signal 140 is generally of the same shape as the emitter drive signal 134, although it may differ to some extent as a result of noise, interference, cross-talk between different emitter/sensor pairs, interfering signals from other LIDAR devices, pulse stretching, and so forth. The return signal 140 will also be delayed with respect to the emitter drive signal 134 by an amount of time corresponding to the round-trip propagation time of the emitted laser burst (i.e., the time of flight of the emitted burst).

The ADC 142 receives and digitizes the return signal 140 to produce a digitized return signal 144. The digitized return signal 144 is a stream of digital values indicating the magnitude and timing of the digitized return signal 144 over time. In this example, the digitized return signal 144 is provided to a cross-correlator 146, which correlates a specific digitized return signal 144 with the corresponding emitter drive signal 134 and outputs a time of flight signal 148 indicative of a time shift from emission of the light pulse by the light source to detection of the reflection of the return of the light pulse at the light sensor. In some configurations, the some or all of the functions of the cross-correlator 146 may be performed by the controller 124. Once a return signal is correlated or matched with an emitted signal, the controller 124 can then use the time of flight of the pulse of light in combination with the known speed of light to calculate a distance D to the object 122. While the distance D is depicted in this figure as just a distance between the first lens 116 and the object 122, in practice the distance D may take into account a total roundtrip distance of the light path from the light source 104 to the light sensor 106 (i.e., including the distances between the light sources 104 and light sensors 106 and their respective lenses 116 and 118). The foregoing example is just one of many techniques that may be used to recover the time of flight of the emitted pulse.

However, if, as in the case of FIG. 1, the distance D to the object 122 is already known (i.e., if the object 122 is positioned at a known, fixed distance from the light source 104 and the light sensor 106), the object 122 may serve as a reference surface and may be used to calibrate the LIDAR sensor assembly 100 as described further with reference to FIG. 3 below. That is, the time of flight signal 148 while the while the LIDAR assembly is aimed at the reference surface (i.e., object 122) can be used as a "reference signal" against which to calibrate the LIDAR sensor assembly 100. The reference signal (i.e., time of flight signal 148 while the LIDAR assembly is aimed at the reference surface (i.e., object 122)) may be captured uniquely for each channel in the LIDAR sensor assembly 100, may be stored and used for multiple subsequent measurements, and may be updated over time to account for thermal drift and/or other variables. In some examples, the reference signal may be updated at least once per revolution of the chassis. In other examples, the reference signal may be updated more or less frequently. Furthermore, in some examples, multiple readings may be performed and averaged to create the reference signal.

Thus, by fixing the object 122 in a scan path of the optical axes of the first lens 116 and the second lens 118 at a known distance D from the LIDAR sensor assembly 100, the object 122 can be used as a reference surface. In some examples, the object 122 may be part of the LIDAR sensor assembly 100 (e.g., a support surface, part of the housing, a lens, etc.), while in other examples, the object 122 may be part of a surrounding environment (e.g., a vehicle, machine, or other structure) which is fixed relative to the LIDAR sensor assembly 100.

Example Calibration of LIDAR Sensor Assembly

Figure 2:
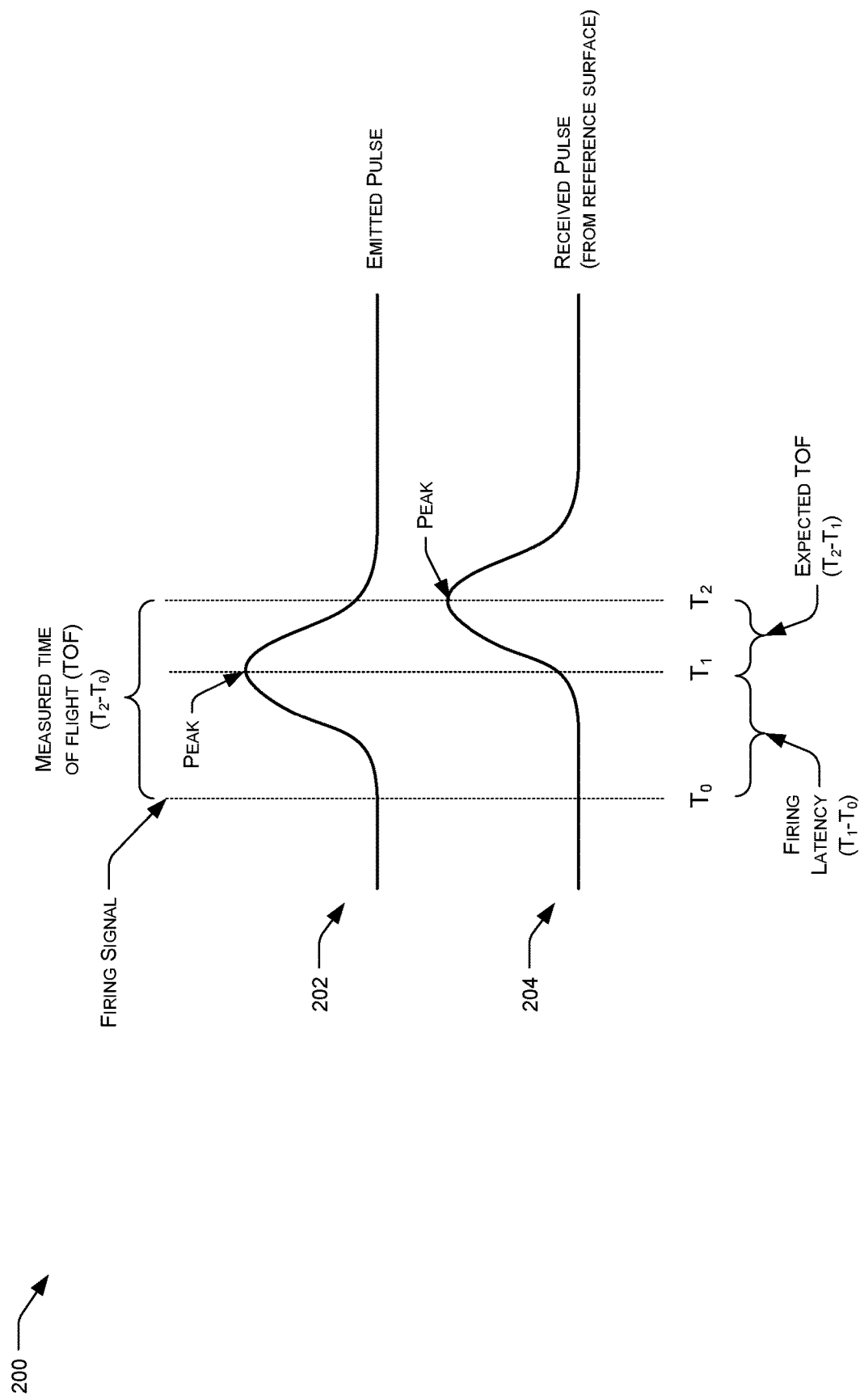
FIG. 2 is a timing diagram of a pulse emitted by an example LIDAR sensor assembly and a received pulse corresponding to light reflected off of a fixed reference surface.

FIG. 2 is a timing diagram to illustrate calibration of a LIDAR sensor assembly such as that shown in FIG. 1. For ease of discussion, FIG. 2 is described in the context of the LIDAR sensor assembly 100 of FIG. 1. However, the concepts illustrated in FIG. 2 are not limited to performance by the LIDAR sensor assembly 100 and may be employed using other systems and devices. Moreover, FIG. 2 depicts an example for a single pulse on a single channel of a LIDAR system. However, in other examples, this technique may be performed for each channel of a LIDAR system, and may be performed multiple times and/or using multiple pulses.

The timing diagram 200 includes a waveform 202 representing a pulse emitted by an example LIDAR sensor assembly and a waveform 204 representing a received pulse corresponding to the emitted light reflected off of a fixed reference surface. In some examples, the emitter drive signal 134 may be used as the waveform 202 representing the emitted pulse, while the return signal 140 may be used as the waveform 204 representing a received pulse corresponding to light reflected off of a fixed reference surface.

As shown in FIG. 2, $T_0$ corresponds to a time at which the capacitive driver 132 issues the emitter drive signal 134 to cause the light source 104(1) to fire (i.e., the time at which the signal is transmitted). However, as discussed above, the light pulse is not emitted instantaneously. Rather, when the emitter drive signal 134 is applied to the light source 104(1), the light source 104(1) emits a Gaussian pulse that ramps up over time to a peak before dropping back off $T_1$ corresponds to the peak of the emitted light pulse, and $T_2$ corresponds to the peak of the return signal. The expected time of flight of the light pulse is equal to a time between the peak of the emitted pulse $T_1$ and the peak of the received pulse $T_2$. That is, expected time of flight equals $T_2-T_1$. However, as discussed above, the time corresponding to the peak of the emitted light pulse $T_1$ may not be known or directly measurable. Instead, the LIDAR sensor assembly 100 may determine a measured time of flight between transmission of the firing signal $T_0$ and the peak of the received pulse $T_2$. That is, the measured time of flight equals $T_2-T_0$. Then, unlike conventional systems, the LIDAR sensor assembly 100 can compute $T_1$ based on the received pulse from the reference surface. Specifically, using the known distance D to the reference surface and the speed of light, the LIDAR sensor assembly 100 can compute the expected time of flight (i.e., the amount of time it should take the emitted pulse to complete the round trip to the reference surface and back). From this, the LIDAR sensor assembly 100 can compute the time corresponding to the peak of the emitted light pulse $T_1$. This also allows, the LIDAR sensor assembly 100 to determine a firing latency (i.e., an amount of time from issuance of the firing signal $T_0$ to the peak of the emitted light pulse $T_1$) attributable to performance characteristics and limitations of the components of the LIDAR systems, such as the capacitive drivers 132 and the light sources 104.

In other examples, due to the relatively short distance D to the reference surface (typically a few centimeters or less), the time of flight of the light pulse to the reference surface may be negligible (i.e., $T_2-T_1$ may be negligible) when compared with time of flight of light pulses emitted in the detection angle of the LIDAR sensor assembly (i.e., pulses emitted into the surroundings of the LIDAR sensor assembly to detect objects in the surroundings), which are typically in the range of about 1 meter to about 100 meters from the LIDAR sensor assembly. In that case, the LIDAR sensor assembly 100 may treat the firing latency to be a whole period from the signal to fire $T_0$ to receipt of the peak return signal $T_2$.

In some examples, the LIDAR sensor assembly 100 may determine when the chassis 102 is oriented to emit light toward the reference surface 122 based on the return signals (e.g., the shortest return signal received during each revolution may be determined to correspond to the reference surface). In other examples, a portion of the rotation of the chassis 102 during which pulses are emitted toward the reference surface 122 may be defined as a reference angle, and a rotary encoder coupled to the chassis 102 may be used to indicate when the chassis 102 is oriented to emit light within the reference angle. Return signals received while the chassis 102 is oriented in the reference angle may be determined to correspond to the reference surface.

In some examples, the intensity of the reflected light returned from the reference surface may be measured and compared to previous returns to detect changes in performance of the light sources (e.g., determine degradation, burnout, or malfunction of a light source, storage capacity of a capacitor or other power source, or the like). For instance, if the peak of the received reference pulse has a magnitude lower than previous received reference pulses, or if a sequence of received reference pulses shows a downward trend of peak values, the LIDAR sensor assembly 100 may determine that the light source corresponding to the emitted pulse is burning out, is damaged, is dirty, or is otherwise in need of service.

In some examples, other characteristics of the return pulse, such as the shape of the return pulse (e.g., how Gaussian, how steep/sharp, how wide, etc.), may additionally or alternatively be measured. The shape of the return pulse may provide additional information which may be useful for calibration of the LIDAR sensor and/or correlation of emitted and received signal pulses, for example.

Example LIDAR Sensor Assembly with Integral Reference Surface(s)

Figure 3A:
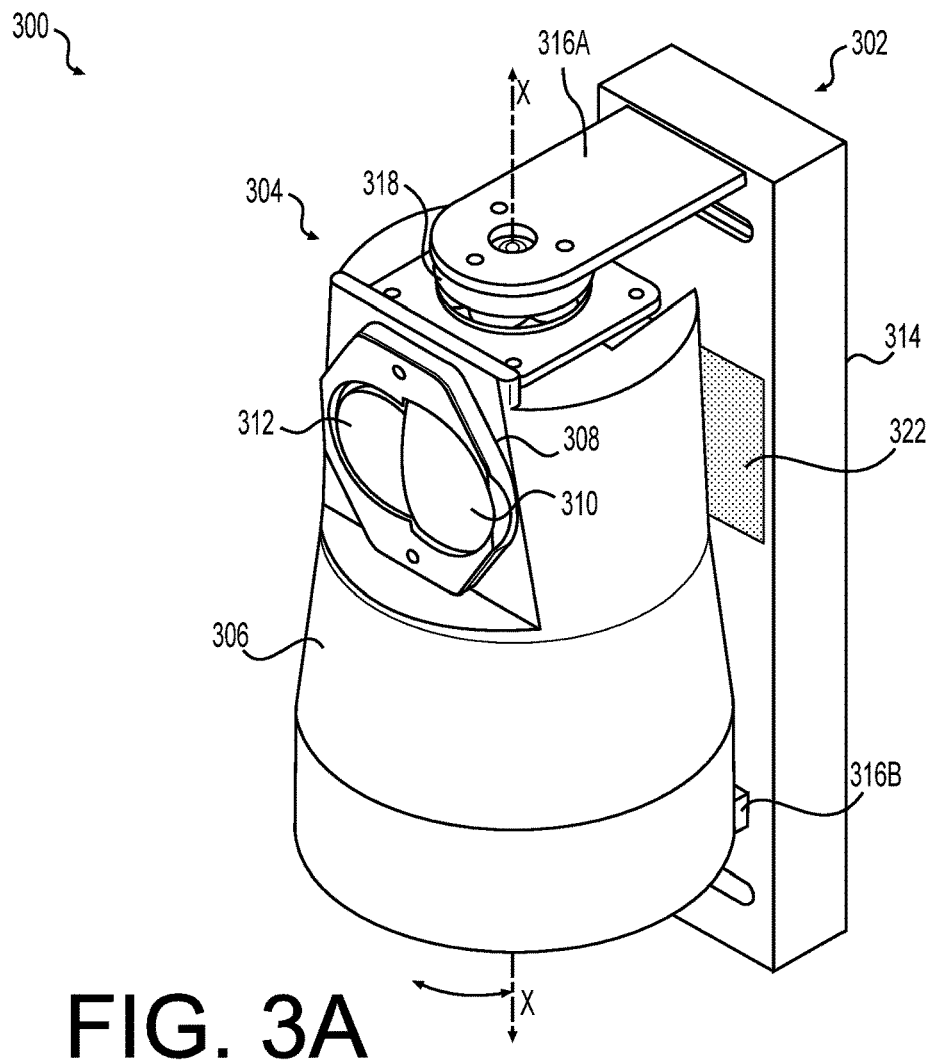
FIG. 3A is a perspective view of an example LIDAR sensor assembly including a stationary support structure including a fixed reference surface, and with an outer housing omitted for clarity.
Figure 3B:
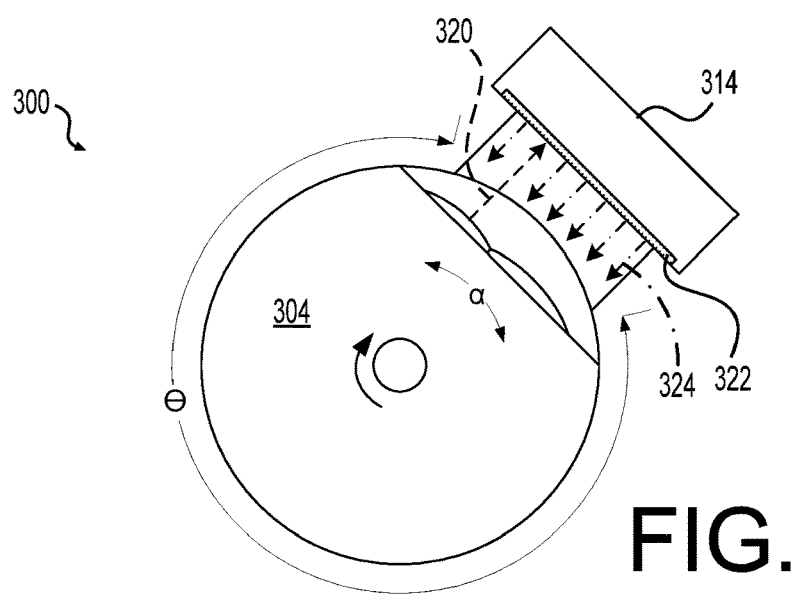
FIG. 3B is a simplified top view of the example LIDAR sensor assembly of FIG. 3A, shown with a top support rib omitted for clarity.
Figure 4A:
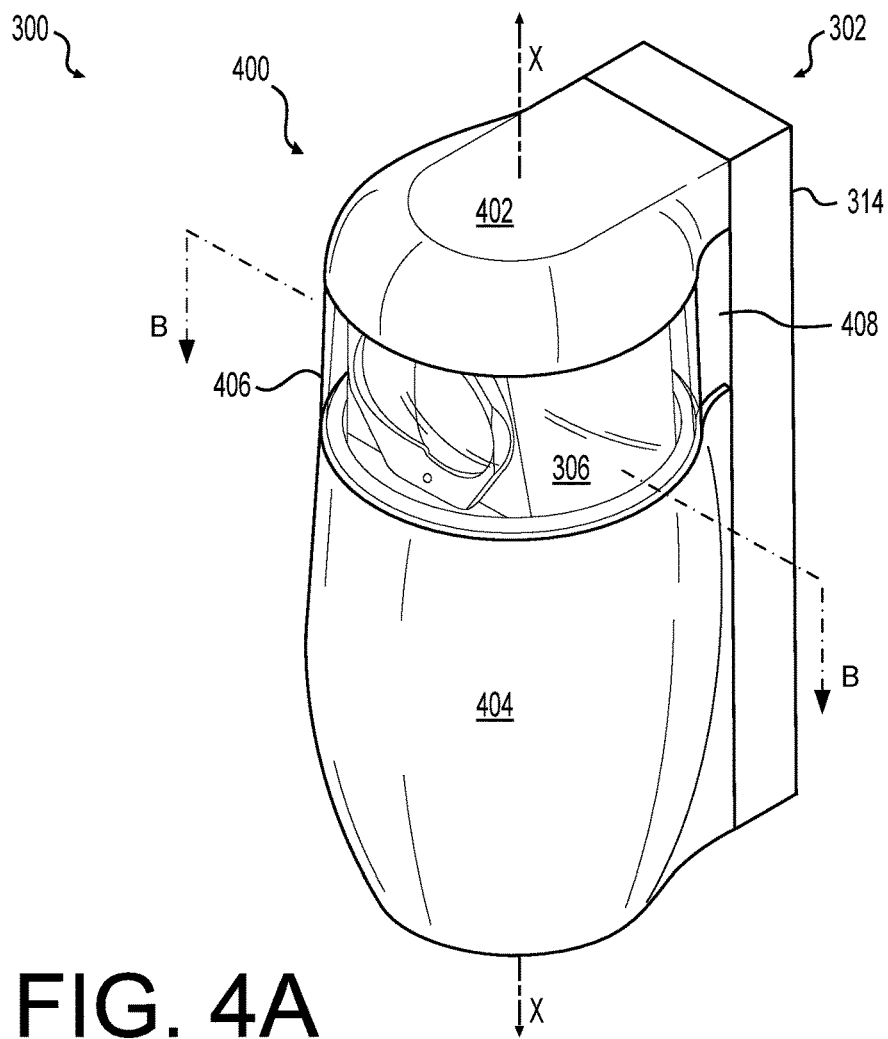
FIG. 4A is a perspective view of the example LIDAR sensor assembly FIG. 3A showing the outer housing including a ring lens.
Figure 4B:
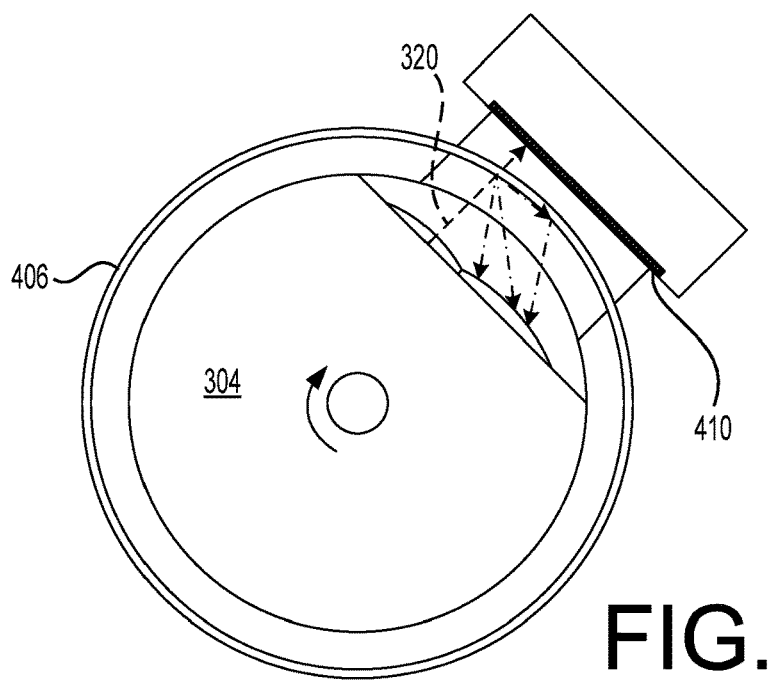
FIG. 4B is a simplified cross sectional view of the example LIDAR sensor assembly of FIG. 4A, taken along line B-B of FIG. 4A.

FIGS. 3A, 3B, 4A, and 4B illustrate an example LIDAR sensor assembly 300 with one or more integral reference surfaces. In particular, FIG. 3A is a perspective view of the example LIDAR sensor assembly 300 with an outer housing omitted for clarity. FIG. 3B is a simplified top view of the example LIDAR sensor assembly 300, with a top support rib omitted. FIG. 4A is a perspective view of the example LIDAR sensor assembly 300 showing the outer housing. FIG. 4B is a simplified cross sectional view of the example LIDAR sensor assembly 300, taken along line B-B of FIG. 4A.

FIG. 3A illustrates the LIDAR sensor assembly 300 including a stationary portion 302 and a rotatable assembly 304 coupled to, and rotatable relative to, the stationary portion 302. The rotatable assembly 304 includes an elongated chassis 306 which houses multiple laser light sources to emit laser light, multiple light sensors, and associated circuitry and electronics (e.g., one or more controllers, charge circuits, capacitive drivers, ADCs, cross correlators, etc.), such as those shown in FIG. 1. The elongated chassis 306 has a generally frustum shape, which tapers from a top end to a bottom end. The elongated chassis 306 has an axis of rotation X substantially at a radial center of the frustum, about which the rotatable assembly 304 rotates. A lens assembly 308 includes a first lens 310 positioned in an optical path of the laser light sources, and a second lens 312 positioned in an optical path of the light sensors. In this example, the first lens 310 and the second lens 312 each constitute less than a full circle such that portions of the circumferences of the lenses that are closest together are truncated so they can be closer together. In other words, centers of the first lens 310 and the second lens 312 are less than one diameter apart from each other. In other examples, however, one or both lenses may be circular, such as the example shown in FIG. 1.

The stationary portion 302 includes an elongated spine 314 which extends substantially parallel to the axis of rotation X of the rotatable assembly 304. The spine 314 may include mounting features (e.g., through holes, connectors, brackets, etc.) to mount the LIDAR sensor assembly 300 to a vehicle, machine, or other surface during operation. The spine 314 may additionally house electronics and/or provide a routing pathway to route conductors to transfer power and/or data between the LIDAR sensor assembly and a computing device. A pair of support ribs 316 extend substantially perpendicular from the spine 314 and couple to first and second ends of the elongated chassis 306. Specifically, a first support rib 316A extends substantially perpendicularly from the spine 314 and couples to a first (top) end of the chassis 306, and the second support rib 316B extends substantially perpendicularly from the spine 314 and couples to a second (bottom) end of the chassis 306. The support ribs 316 are coupled to the chassis 306 by bearings, bushings, or other rotatable connections allowing the chassis 306 to rotate relative to the support ribs 316 and spine 314. In the illustrated example, a motor 318 (e.g., an electric motor) is coupled between the chassis 306 and the support rib 316A and configured to apply torque to rotate the rotatable assembly 304 about the axis X However, in other examples, the motor 318 may be located in other locations. For instance, the motor may be located on an opposite side of the support rib 316A from the chassis 306. In other examples, the motor 318 may be located remotely from the chassis 306 and torque from the motor 318 may be provided by a device for transmitting torque, such as, for example, one or more gears, one or more shafts, one or more belts, and/or one or more chain drives. In some examples, the motor 318 may be located at the second (bottom) end of the chassis 306, for example, between the support rib 316B and the chassis 306, or on the opposite side of the support rib 316B from the chassis 306.

Because the spine 314 is opaque and extends substantially parallel to the axis of rotation X of the rotatable assembly 304, the spine 314 obstructs a portion of a scan path of the laser light sources and limits a detection angle of the LIDAR sensor assembly 300. Typically, a limited detection angle for a LIDAR sensor is undesirable. However, the LIDAR sensor assembly 300 described in this example can take advantage of this limited detection angle by using the spine 314, which is located at a known distance relative to the rotatable assembly 304, as a fixed reference surface in order to calibrate the LIDAR sensor assembly according to the techniques described herein.

FIG. 3B illustrates the limited detection angle of the LIDAR sensor assembly 300. As shown, the detection angle of the LIDAR sensor assembly 300 is indicated by the angle θ. Over the angle θ the LIDAR sensor assembly 300 emits laser light into a scene surrounding the LIDAR sensor assembly 300 to detect objects in the scene. However, over the angle α (360-θ) the spine 314 obstructs the laser light. The angle θ that is obstructed by the spine 314 depends on the width of the spine, the distance of the spine 314 from the axis of rotation X, the spacing of the optical axes of the first lens 310 and the second lens 312. In the illustrated example, the angle θ is about 270 degrees. In some examples, the angle θ may be between about 240 degrees and about 300 degrees. However, in other examples, the angle θ may be greater than or less than those listed. For instance, in the case of a nose mounted LIDAR sensor assembly θ may be about 180 degrees, while in a top mounted LIDAR assembly θ may be 360 degrees (as will be discussed further with respect to FIG. 5).

Within the angle α, the LIDAR sensor assembly 300 may emit one or more pulses of light. For ease of illustration, FIG. 3B illustrates a single emitted pulse of light shown by the dashed line 320. However, in practice the LIDAR sensor assembly may fire multiple pulses of light from multiple different light sources as the sensor rotates through angle α. Due to the relative proximity of the of the spine 314 to the rotatable assembly 304, parallax may result in the emitted light pulse 320 from being reflected back at an angle that would not ordinarily be incident on the lens 312 and would, therefore, not be detected by the corresponding light sensor within the chassis 306. In order to avoid this parallax problem and ensure that a return signal is received for each light pulse that is emitted within angle α, a light diffuser 322 may be disposed on at least a portion of a surface of the spine 314 closest to the rotatable assembly 304. The light diffuser 322 may be formed integrally with the spine 314 or may be applied to all or a portion of the spine 314 (e.g., as a cover, sticker, paint, or coating). The diffuser 322 provides substantial internal reflection, such that when hit with light at any location on its surface, the diffuser emits light from substantially its entire surface, as shown by the dot dash lines 324 in FIG. 3B. The diffuser 322 can comprise any material capable of providing the desired internal reflection such as, for example, a retroreflector, a white or reflective material having a textured surface (e.g., bead blasted glass or acrylic, acid etched glass, etc.), etc.

Thus, when a controller of the LIDAR sensor assembly causes a light source to emit a pulse of laser light toward the reference surface (i.e., anywhere within angle α), a signal is received from the light sensor indicating detection of reflected light corresponding to reflection of the pulse of laser light from the fixed reference surface. Based on this signal indicating detection of the reflected light corresponding to reflection of the pulse of laser light from the fixed reference surface and the known distance to the reference surface, the controller is able to calibrate the LIDAR sensor assembly 300 to account for performance characteristics of the light sources, drivers of the light sources, and other components of the LIDAR sensor assembly 300.

While omitted from FIGS. 3A and 3B for clarity, the LIDAR sensor assembly 300 may also include an outer housing, such as the one shown and described with reference to FIGS. 4A and 4B below. The outer housing may include a substantially transparent ring lens through which light is emitted from and received by the LIDAR sensor assembly 300. The inclusion of the outer housing, including the ring lens, does not substantially change the operation of the LIDAR sensor assembly provided above. In some examples, the ring lens may be made of an antireflective material and/or interior and exterior surfaces of the ring lens may be coated with an antireflective coating in order to minimize the optical effects of the ring lens on the light entering and exiting the LIDAR sensor assembly 300.

FIG. 4A is a perspective view of the example LIDAR sensor assembly 300, showing an outer housing 400 to cover and protect the rotatable assembly 304 and the electronics of the LIDAR sensor assembly 300. The outer housing 400 includes an opaque cap 402 and main body 404, and a substantially transparent ring lens 406 interposed between the cap 402 and the main body 404. The cap 402 is disposed at and covers the first support rib 316A and the first end (the top) of the rotatable assembly 304 of the LIDAR sensor assembly 300. The main body 404 surrounds and encloses the second support rib 316B and the second end (bottom) of the rotatable assembly 304. The ring lens 406 encircles the portion of the rotatable assembly 304 through which light enters and exits the lens assembly 308. Thus, the ring lens 406 facilitates the passage of light to and from the LIDAR sensor assembly 300 as the rotatable assembly 304 rotates within the outer housing 400. The outer housing 400 encloses the rotatable assembly 304 and is coupled to the stationary portion 302 of the LIDAR sensor assembly 300. The cap 402 and the main body 404 are contoured to generally conform to an outer geometry of the rotatable assembly 304 around a majority of its circumference, before curving at an edge closest to the spine 314 to mate with lateral edges of the spine 314. Contoured trim pieces 408 may be included to fill a gap between the ring lens 406 and the spine 314 and to match the contours of the cap 402 and the main body 404. The contoured trim pieces 408 may be opaque or transparent. One or more O-rings (not shown) may be provided at the interfaces between the cap 402 and the ring lens 406, and/or between the ring lens 406 and the main body 404, in order to prevent dirt and moisture from entering the outer housing 400. Gaskets and/or sealants may be provided between the outer housing 400 and the spine 314 in order to prevent dirt and moisture from entering the outer housing 400.

FIG. 4B is a simplified cross sectional view of the example LIDAR sensor assembly 300, taken along line B-B of FIG. 4A. FIG. 4B is similar to the example described with reference to FIG. 3B except that in this case, instead of (or in addition to) the spine 314, the ring lens 406 serves as the fixed reference surface for calibrating the LIDAR sensor assembly. Like the spine 314, the ring lens 406 is fixed a known distance from the rotatable assembly 304 and can also serve as a reference surface. Just as in FIG. 3B, for ease of illustration a single pulse of light, shown by the dashed line 320, is emitted from the rotatable assembly 304. However, in practice, the LIDAR sensor assembly may fire multiple pulses of light from multiple different light sources. In the example of FIG. 4B, at least a portion of the pulse of light is reflected by the ring lens 406. In this example, an interior surface of the ring lens 406 may not be coated with an antireflective material. The reflected portion of the light pulse is shown by the dot dash lines. As shown, there may be multiple internal reflections of the light pulse. At least some of the reflected light enters the lens 312 and is received by a light sensor of the LIDAR sensor assembly 300. Upon receipt of the reflected light, the light sensor generates a signal indicating detection of the reflected light corresponding to reflection of the pulse of laser light from the fixed reference surface (the ring lens 406 in this example). Based on this return signal from the reference surface and the known distance to the reference surface, the controller is able to calibrate the LIDAR sensor assembly 300 to account for performance characteristics of the light sources, drivers of the light sources, and other components of the LIDAR sensor assembly 300.

When the ring lens 406 is used as the reference surface, the calibration operation is not necessarily limited to a portion of the rotation during which the scan direction of the rotatable assembly 304 is directed toward the spine 314. Because a portion of each emitted light pulse is reflected by the ring lens 406 and detected by the light sensors, the LIDAR sensor assembly 300 could be calibrated based on any emitted light pulse emitted at any angle of rotation of the rotatable assembly 304, not necessarily when oriented toward the spine 314. However, in some examples, it may be beneficial to calibrate the LIDAR sensor assembly 300 based on pulses emitted toward the spine 314 since the system need not be simultaneously determining a distance to an object in the surroundings (since the distance to the spine is known). Additionally, in some examples, the spine 314 may include an optically black portion 410 (or substantially light absorbing portion). The surface of the spine 314 may be made optically black by, for example, constructing all or a portion of the spine of an optically black material, or by applying an optically black cover, sticker, paint, or other coating. By including the optically black portion 410, pulses of light incident on the optically black portion 410 will be absorbed and will not be reflected. Thus, if the LIDAR sensor assembly 300 is calibrated based on pulses emitted toward the spine 314, the only return will be the reflections from the ring lens 406. Thus, reduces noise and thereby reduces the computational complexity of calibrating the LIDAR sensor assembly 300 based on the return from the ring lens 406 as the reference surface.

Additionally, in some examples, the return from the ring lens 406 as the reference surface may be measured during the calibration, and may be filtered out of subsequent distance measurements (i.e., during the portion of the rotation not obstructed by the spine). During operation, the LIDAR sensor assembly 300 receives multiple returns for every light emission (e.g., one or more reflections from the ring lens 406 as well as desired returns from actual objects in the surrounding scene). During normal distance measurements, the reflections from the ring lens 406 are extraneous noise that can degrade the accuracy of the LIDAR sensor assembly. However, in examples that employ an optically black portion 410 and use the ring lens 406 as a reference surface, the return signals corresponding to reflections the ring lens 406 can be isolated and filtered out, thereby eliminating noise from the return signal and further improving accuracy of the LIDAR sensor assembly 300.

Figure 5:
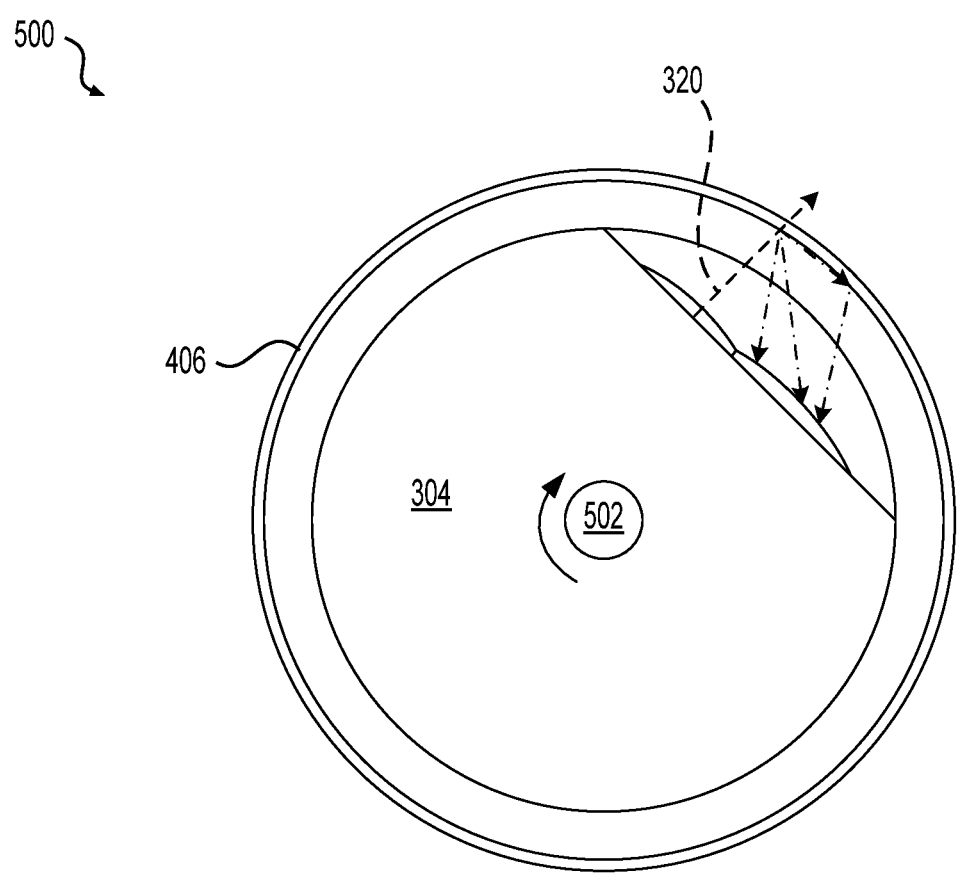
FIG. 5 is a simplified cross sectional view of another example LIDAR sensor assembly with an unobstructed 360-degree detection angle.

FIG. 5 is a simplified cross sectional view of another example LIDAR sensor assembly 500 that has an unobstructed 360-degree detection angle. FIG. 5 is similar to the example of FIG. 4B, except that the spine 314 and at least one of the support ribs 316A and/or 316B is omitted. In this example, the LIDAR sensor assembly 500 is supported entirely by an axle 502 extending from a top or a bottom of the LIDAR sensor assembly 500. Thus, the detection angle of the LIDAR sensor assembly 500 is unobstructed and the LIDAR sensor assembly 500 has a full 360-degree detection angle. The LIDAR sensor assembly 500 may still employ the ring lens 406 as a reference surface for calibration according to the techniques described above.

Example System of LIDAR Sensors Coupled to Vehicle

Figure 6:
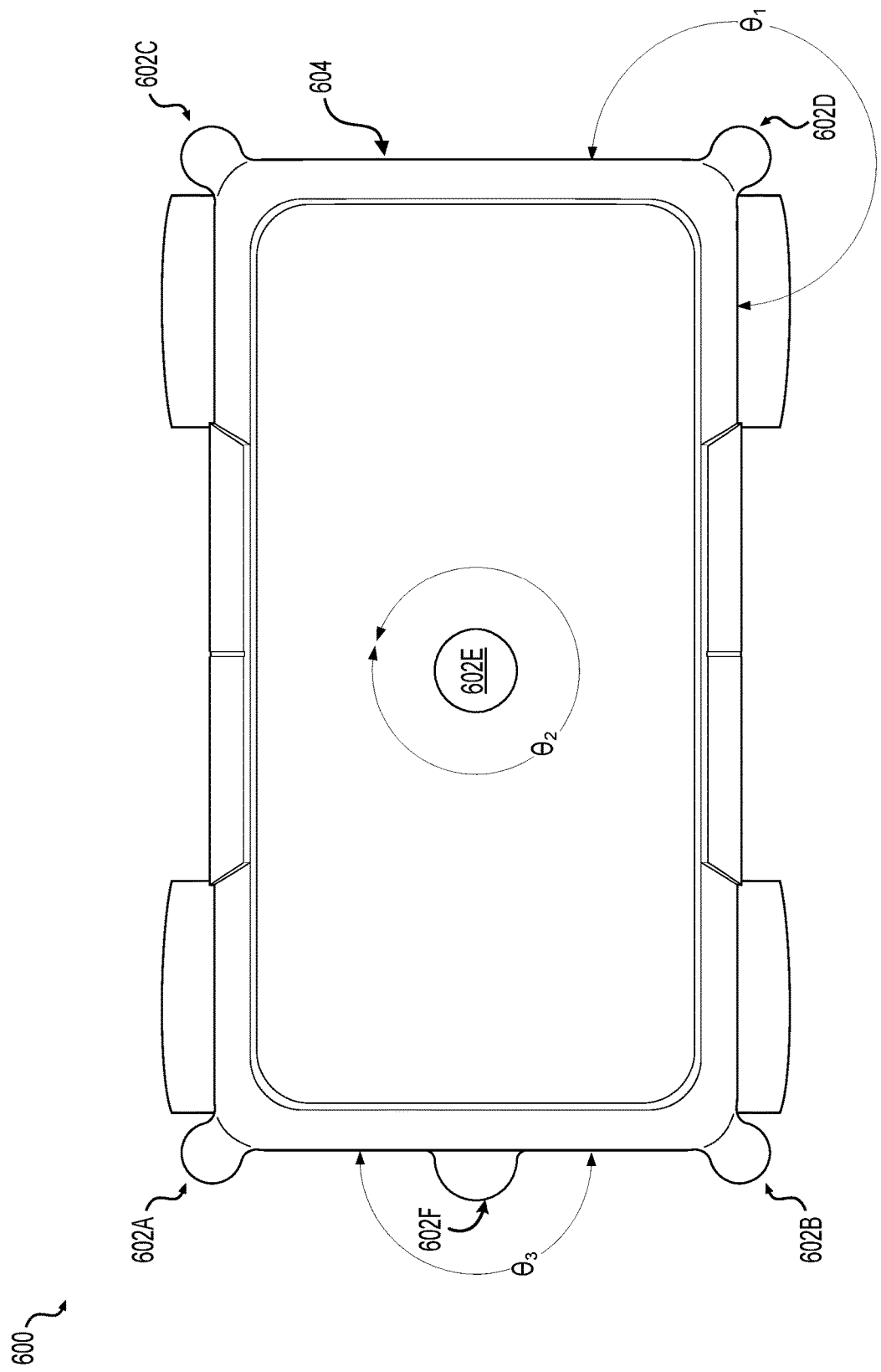
FIG. 6 is a top plan view of an example vehicle having multiple LIDAR sensor assemblies mounted to the vehicle.

FIG. 6 illustrates an example system 600 including a multiple LIDAR sensor assemblies 602A-602F (referred to collectively as "LIDAR sensor assemblies 602") mounted to a vehicle 604. The vehicle 604 in this example is illustrated as being an autonomous passenger vehicle. However, in other examples, LIDAR assemblies can be mounted to non-passenger vehicles, robots, aircraft, and other vehicles, and may be autonomous, semi-autonomous, or human driven.

FIG. 6 illustrates four corner mounted LIDAR sensor assemblies 602A-602D, a top mounted LIDAR sensor assembly 602E, and a nose mounted LIDAR sensor assembly 602F. The corner mounted LIDAR sensor assemblies 602A-602D may be the same as or similar to those shown in FIGS. 3A, 3B, 4A, and/or 4B, for example, and may have a detection angle $\theta_1$ of at least about 240 degrees and at most about 270 degrees. The top mounted LIDAR sensor assembly 602E may be the same as or similar to that shown in FIG. 5, for example, and may have a detection angle $\theta_2$ of about 360 degrees. The nose mounted LIDAR sensor assembly 602F may be similar to those shown in FIGS. 3A, 3B, 4A, and/or 4B, for example, and may have a detection angle $\theta_3$ of at least about 160 degrees and at most about 180 degrees. In some examples, the system 600 may include all of the illustrated LIDAR sensor assemblies 602, a subset of the LIDAR sensor assemblies (e.g., only the corner mounted LIDAR sensor assemblies 602A-602D), or the system 600 may include additional LIDAR sensor assemblies (e.g., a tail mounted LIDAR assembly, side or door mounted LIDAR sensor assemblies, etc.). The LIDAR sensor assemblies 602 may be coupled to one or more body panels or structural members of the vehicle 604 or may be formed integrally with the vehicle body itself (e.g., the LIDAR sensor assembly housing may be formed into the contour of a fender, hood, bumper, door, roof, or other portion of the vehicle body).

In some examples, a portion of the vehicle body may be within a detection angle of a LIDAR sensor assembly 602. In that case, the LIDAR sensor assembly may be fixed relative to the portion of the vehicle and, thus, the portion of the vehicle body may serve as a fixed reference surface and may be used for calibration of the LIDAR sensor assembly according to the techniques described herein.

Figure 7:
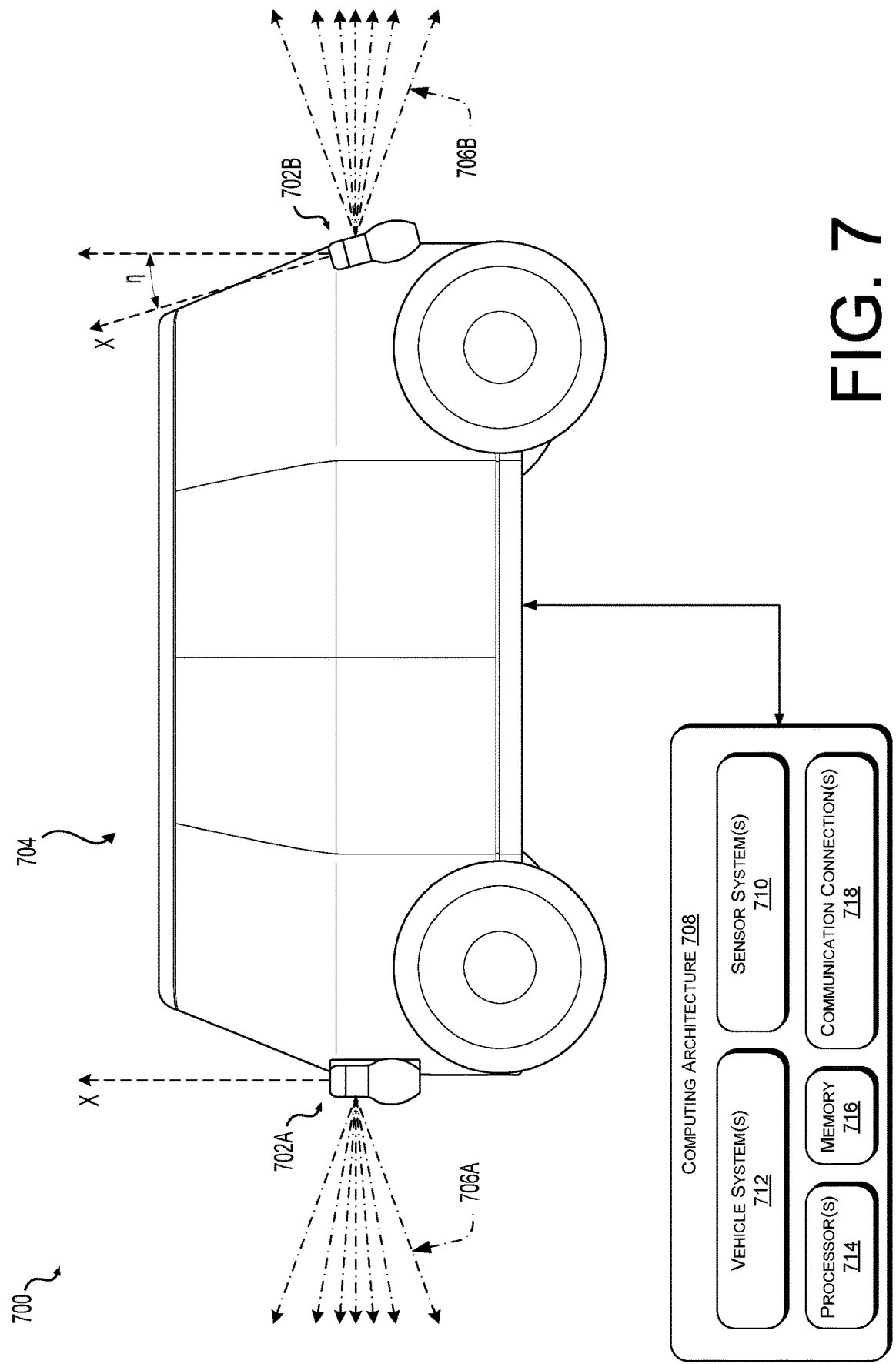
FIG. 7 is a side view of an example vehicle showing example mounting orientations for LIDAR sensor assemblies.

FIG. 7 is a side view of an example system 700 including a multiple LIDAR sensor assemblies 702A and 702B (referred to collectively as "LIDAR sensor assemblies 702") mounted to a vehicle 704 at different orientations. Specifically, the system 700 includes a first LIDAR sensor assembly 702A mounted at a front corner of the vehicle 704. The first LIDAR sensor assembly 702A is mounted such that an axis of rotation X of the first LIDAR sensor assembly 702A is oriented substantially vertically (i.e., normal to the horizon). The first LIDAR sensor assembly 702A is configured such that a pattern of emitted light pulses 706A is spanning the horizon, with some pulses being angled above the horizon and some pulses that are below the horizon. In some examples, the pattern of emitted light pulses may be concentrated around the horizon with fewer pulses emitted at angles further from the horizon. However, other scan patterns are also contemplated having light pulses emitted at other angles relative to the horizon.

The second LIDAR sensor assembly 702B is mounted such that an axis of rotation X of the first LIDAR sensor assembly 702B is offset by angle η relative to vertical (i.e., is tilted at an oblique angle from normal to the horizon). Nevertheless, the second LIDAR sensor assembly 702B is configured such that a pattern of emitted light pulses 706B is substantially the same as that of LIDAR sensor assembly 702A. This may be achieved, for example, by angling one or more mirrors in the LIDAR sensor assembly. However, again, other scan patterns are also contemplated having light pulses emitted at other angles relative to the horizon.

In some examples, different LIDAR sensor assemblies of the vehicle 704 may have different scan patterns. For instance, some LIDAR sensor assemblies (e.g., corner mounted LIDAR sensor assemblies) may have scan patterns centered around the horizon, while one or more other LIDAR sensor assemblies (e.g., nose or tail mounted LIDAR sensor assemblies) may have scan patterns oriented below the horizon (e.g., to detect objects closer to a front of the vehicle). These and other variations of mounting configurations are contemplated for LIDAR sensor assemblies according to this disclosure.

FIG. 7 also illustrates an example computing architecture 708 of the vehicle 704. The computing architecture 708 includes one or more sensor systems 710. The sensor system(s) 710 include the LIDAR sensor assemblies 702 and may include one or more other sensor systems such as, for example, one or more cameras, radar sensors, microphones, navigation sensors (e.g., GPS, compass, etc.), motion sensors (e.g., inertial sensors, odometers, etc.), and/or environmental sensors (e.g., temperature sensors, pressure sensors, humidity sensors, etc.). The sensor system(s) 710 provide input directly to one or more vehicle systems 712. The vehicle system(s) 712. In some examples, the vehicle system(s) 712 may include a vehicle control system to control steering, propulsion, braking, safety systems, and/or communication systems of the vehicle 704. Additionally, in some examples, such as when the vehicle 704 is an autonomous vehicle, the vehicle systems may also include a localizer system to estimate a change in position of the vehicle 704 over time, a perception system to perform object detection and/or classification, and/or a planner system to determine routs and/or trajectories to use to control the vehicle. Additional details of localizer systems, perception systems, and planner systems that are usable can be found in U.S. patent application Ser. No. 15/281,416, filed Sep. 30, 2016, entitled "Estimating Friction Based On Image Data," which is incorporated herein by reference.

The computing architecture 708 also includes one or more processors 714 and memory 716 communicatively coupled with the one or more processors 714. The processor(s) 714 may be any suitable processor capable of executing instructions to implement the vehicle system(s) 712. By way of example and not limitation, the processor(s) 714 may comprise one or more Central Processing Units (CPUs), Graphics Processing Units (GPUs), or any other device or portion of a device that processes electronic data from registers and/or memory to transform that electronic data into other electronic data that may be stored in registers and/or memory.

Memory 716 is an example of non-transitory computer-readable media. Memory 716 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information.

The computing architecture 708 also includes one or more communication connections 718 that enable communication by the vehicle with one or more other local or remote computing devices. The communications connection(s) 718 include physical and/or logical interfaces for connecting the computing architecture 708 to another computing device or a network. For example, the communications connection(s) 718 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Example Process of Calibrating LIDAR Sensor Assemblies

Figure 8:
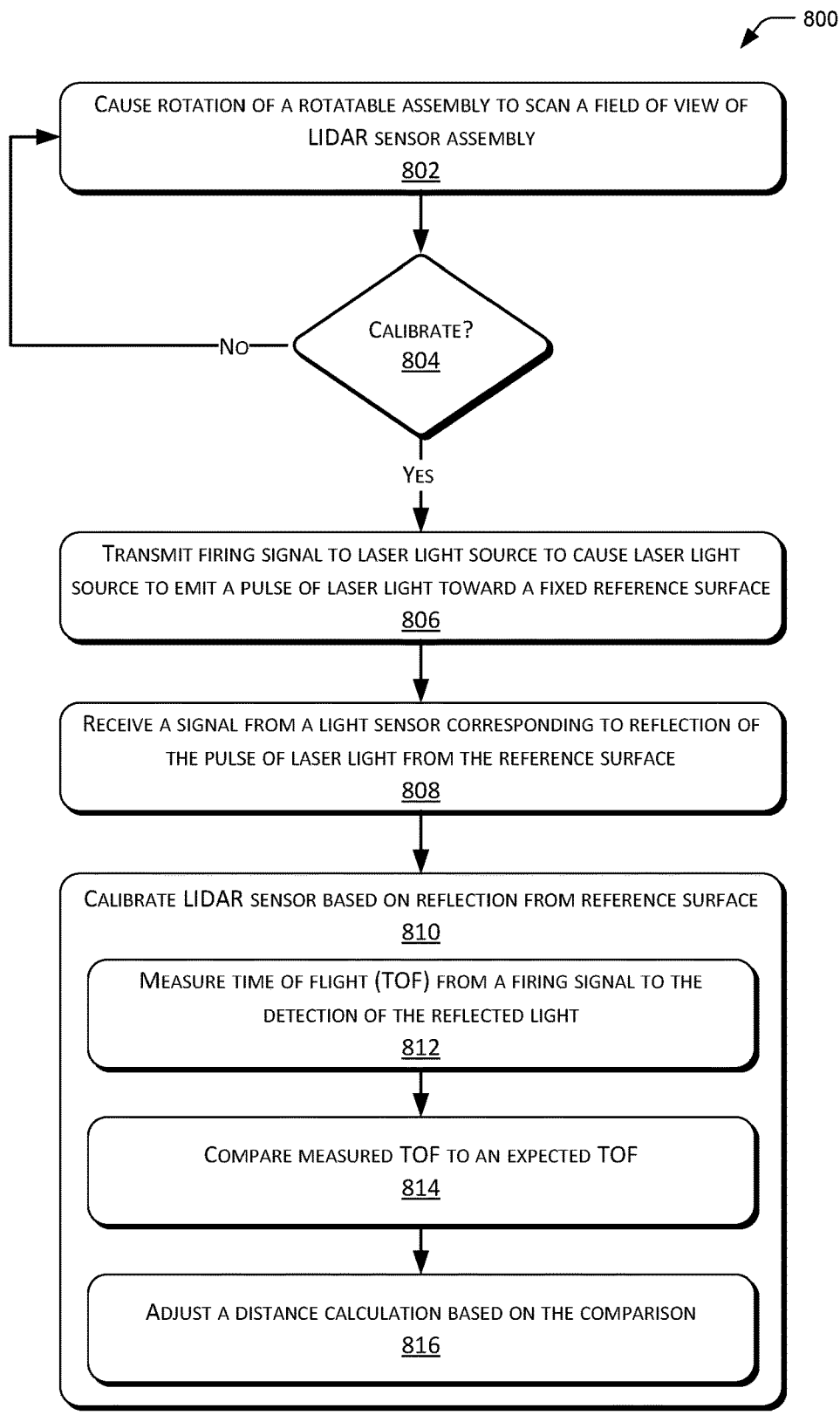
FIG. 8 is a flowchart illustrating an example method of calibrating a LIDAR sensor assembly using a reference surface that is fixed relative to the LIDAR sensor assembly.

FIG. 8 is a flowchart illustrating an example method 800 of calibrating a LIDAR sensor assembly using a reference surface that is fixed relative to the LIDAR sensor assembly. The method 800 is described with reference to the LIDAR sensor assembly of FIG. 1 for convenience and ease of understanding. However, the method 800 is not limited to being performed using the LIDAR sensor assembly of FIG. 1 and may be implemented using any of the other LIDAR sensor assemblies and/or systems described in this application, as well LIDAR sensor assemblies and systems other than those described herein. Moreover, the LIDAR sensor assemblies and systems are not limited to performing the method 800.

At operation 802, rotatable assembly of a LIDAR sensor assembly, such as LIDAR sensor assembly 100 is caused to rotate. This rotation may be caused by a controller (e.g., controller 124 of the LIDAR sensor assembly, a controller of one of vehicle sensor systems 710, etc.). As the rotatable assembly rotates, the LIDAR sensor assembly scans a detection angle by emitting laser light pulses from one or more light sources (e.g., light sources 104) and receiving reflected returns corresponding to the emitted light pulses by one or more corresponding light sensors (e.g., light sensors 106). In some examples, operation 802 may be initiated upon startup of a vehicle or other machine to which the LIDAR sensor assembly is used.

At operation 804, the controller of the LIDAR sensor assembly or a controller of a sensor system of a vehicle determines whether to calibrate the LIDAR sensor assembly. In some examples, the controller may be configured to calibrate the LIDAR sensor assembly at least once per revolution of the rotatable assembly. In some examples, the controller may be configured to calibrate the LIDAR sensor assembly every time a light source emits light toward a reference surface. In some examples, the controller may be configured to calibrate the LIDAR sensor assembly periodically (e.g., every M units of time or number of revolutions, where M is any number greater than or equal to 2). In some examples, the controller may be configured to calibrate the LIDAR sensor assembly responsive to occurrence of a triggering event such as powering on the LIDAR sensor assembly, a change in temperature, a difference in measurements by the LIDAR sensor assembly and another LIDAR sensor assembly, detection of an impact or other force exceeding a normal operating conditions, or the like. If the controller determines not to calibrate the LIDAR sensor assembly, the method returns to operation 802 to scan the detection angle of the LIDAR sensor assembly. If, at operation 804, the controller determines to calibrate the LIDAR sensor assembly, the method proceeds to operation 806.

At operation 806, the controller causes a light source of the LIDAR sensor assembly to emit light toward a reference surface that is fixed in relation to the LIDAR sensor assembly. The reference surface may comprise a part of the LIDAR sensor assembly as in the example of FIGS. 3A and 4A, a part of a vehicle, machine, or other structure to which the LIDAR sensor assembly is mounted, or any other surface that is fixed at a known distance relative to the LIDAR sensor assembly. At operation 808, the controller receives a signal from a light sensor of the LIDAR sensor assembly. The signal received from the light sensor indicates detection of reflected light corresponding to reflection of the pulse of laser light from the reference surface. At operation 810, the controller calibrates the LIDAR sensor assembly based at least in part on the signal indicating detection of the reflected light corresponding to reflection of the pulse of laser light from the reference surface.

In some examples, the calibration operation 810 includes, at operation 812, measuring a time of flight from a firing signal to fire the pulse of laser light from the laser light source to the detection of the reflected light by the light sensor. At operation 814, the controller compares the time of flight to an expected time of flight for the pulse of laser light to travel a known distance from the laser light source to the reference surface and back to the light sensor. And, at operation, 816, the controller may adjust a distance calculation based at least in part on the comparison. In some examples, the calibration operation 810 may include other adjustments in addition to or instead of the operations 812-814. For example, the calibration operation 810 may include measuring an intensity of a return signal indicating detection of the reflected light corresponding to reflection of the pulse of laser light from the reference surface. The measured intensity may be compared to previous returns to detect changes in performance of the light sources (e.g., determine degradation, burnout, or malfunction of a light source, storage capacity of a capacitor or other power source, or the like). In some examples, a drive signal applied to fire the light source may be adjusted (e.g., by adjusting a charge time of one or more capacitive drivers) to adjust an intensity of subsequent light pulses.

Operations 806-810 are described for a single channel of a LIDAR sensor assembly. For LIDAR sensor assemblies having multiple channels, the operations 806-810 may be performed for each channel of the LIDAR sensor assembly. Moreover, the method 800 describes the process for calibrating a single LIDAR sensor assembly. In LIDAR systems including multiple LIDAR sensor assemblies, the method 800 may be performed for each of the multiple LIDAR sensor assemblies.

The method 800 is illustrated as a collection of blocks in logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the method 800 may be combined in whole or in part.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A. An example LIDAR sensor assembly comprises:
a stationary portion having a fixed reference surface;
a rotatable assembly coupled to, and rotatable relative to, the stationary portion, the rotatable assembly comprising:
 a laser light source to emit laser light; and
 a light sensor configured to produce a light signal in response to sensing reflected light corresponding to reflection of the laser light emitted by the laser light source from the fixed reference surface; and a controller communicatively coupled to the laser light source and the light sensor, the controller being operative to:
transmit a firing signal to the light source to cause the light source to emit a pulse of laser light;
receive a signal from the light sensor indicating detection of reflected light corresponding to reflection of the pulse of laser light from the fixed reference surface; and
calibrate the LIDAR sensor assembly based at least in part on the signal indicating detection of the reflected light corresponding to the reflection of the pulse of laser light from the fixed reference surface.

B. An example LIDAR sensor assembly according to example A, wherein the controller is operative to calibrate the LIDAR sensor assembly by: measuring a time of flight from the transmission of the firing signal to the detection of the reflected light by the light sensor; comparing the time of flight to an expected time of flight for the pulse of laser light to travel a known distance from the laser light source to the fixed reference surface and back to the light sensor; and adjusting a distance calculation based at least in part on the comparing.

C. An example LIDAR sensor assembly according to example A or example B, wherein the fixed reference surface is substantially opaque and limits a detection angle of the LIDAR sensor assembly.

D. An example LIDAR sensor assembly according to any one of examples A-C, wherein the fixed reference surface comprises a light diffuser.

E. An example LIDAR sensor assembly according to example A or example B, wherein the fixed reference surface is substantially transparent.

F. An example LIDAR sensor assembly according to any one of examples A-C, wherein the rotatable assembly comprises an elongated chassis having an axis of rotation about which the rotatable assembly is rotatable; wherein the stationary portion comprises: a first support rib rotatably coupled to a first end of the elongated chassis, a second support rib rotatably coupled to a second end of the elongated chassis assembly, and an elongated spine extending between and coupled to the first support rib and the second support rib; and wherein the elongated spine serves as the fixed reference surface.

G. An example LIDAR sensor assembly according to example F, wherein the elongated spine comprises a light diffuser disposed on at least a portion of a surface of the elongated spine closest to the rotatable assembly.

H. An example LIDAR sensor assembly according to any one of examples F or G, wherein the elongated spine is substantially parallel to the axis of rotation of the elongated chassis.

I. An example LIDAR sensor assembly according to any one of examples F-H, wherein the elongated spine comprises a mount for mounting the LIDAR sensor assembly to a vehicle.

J. An example LIDAR sensor assembly according to any one of examples A-C, wherein the stationary portion comprises a housing at least partially enclosing the rotatable assembly, the housing including a ring lens at least partially encircling a portion of the rotatable assembly from which the laser light is emitted and by which the reflected light is received; and wherein the ring lens serves as the fixed reference surface.

K. An example method of calibrating a LIDAR system comprises: transmitting a firing signal to a laser light source of a LIDAR sensor assembly to cause the laser light source to emit a pulse of laser light toward a reference surface fixed in relation to the LIDAR sensor assembly; receiving a signal from a light sensor of the LIDAR sensor assembly, the signal indicating detection of reflected light corresponding to reflection of the pulse of laser light from the reference surface; and calibrating the LIDAR sensor assembly based at least in part on the signal indicating detection of the reflected light corresponding to the reflection of the pulse of laser light from the reference surface.

L. A method according to example K, wherein calibrating the LIDAR sensor assembly comprises: measuring a time of flight from the transmitting of the firing signal to the detection of the reflected light by the light sensor; comparing the time of flight to an expected time of flight for the pulse of laser light to travel a known distance from the laser light source to the reference surface and back to the light sensor; and adjusting a distance calculation based at least in part on the comparing.

M. A method according to one of examples K or L, further comprising causing rotation of a rotatable assembly including the laser light source and the light sensor about an axis of rotation to scan a detection angle of the LIDAR sensor assembly.

N. A method according to any one of examples K-M, further comprising repeating the generating, the receiving, and the calibrating at least once per revolution of the rotatable assembly.

O. A method according to any one of examples K-M, wherein the generating, the receiving, and the calibrating are performed periodically.

P. A method according to any one of examples K-M, wherein the generating, the receiving, and the calibrating are performed responsive to a triggering event.

Q. A method according to any one of examples K-P, further comprising calibrating one or more additional LIDAR sensor assemblies by, for a respective LIDAR sensor assembly of the one or more additional LIDAR sensor assemblies: transmitting a firing signal to a laser light source of the respective LIDAR sensor assembly to cause the laser light source to emit a pulse of laser light toward a reference surface fixed in relation to the respective LIDAR sensor assembly; receiving a signal from a light sensor of the respective LIDAR sensor assembly indicating detection of reflected light corresponding to reflection of the pulse of laser light from the reference surface fixed in relation to the respective LIDAR sensor assembly; and calibrating the respective LIDAR sensor assembly based at least in part on the signal indicating detection of the reflected light corresponding to the reflection of the pulse of laser light from the reference surface fixed in relation to the respective LIDAR sensor assembly.

R. An example system comprises:
a vehicle; and
a LIDAR sensor assembly mounted to the vehicle, the LIDAR assembly including:
a stationary portion;
a rotatable assembly coupled to, and rotatable relative to, the stationary portion, the rotatable assembly comprising:
a laser light source to emit laser light; and
a light sensor configured to produce a light signal in response to sensing reflected light corresponding to reflection of the laser light emitted by the laser light source from a reference surface that is fixed at a known distance in relation to the laser light source and light sensor; and a controller communicatively coupled to the laser light source and the light sensor, the controller being operative to:
   transmit a firing signal to the laser light source to cause the laser light source to emit a pulse of laser light;
   receive a signal from the light sensor indicating detection of reflected light corresponding to reflection of the pulse of laser light from the reference surface; and
   calibrate the LIDAR sensor assembly based at least in part on the signal indicating detection of the reflected light corresponding to the reflection of the pulse of laser light from the reference surface.

S. A system according to example R, wherein the controller is operative to calibrate the LIDAR sensor assembly by: measuring a time of flight from the transmission of the firing signal to the detection of the reflected light by the light sensor; comparing the time of flight to an expected time of flight for the pulse of laser light to travel a known distance from the laser light source to the reference surface and back to the light sensor; and adjusting a distance calculation based at least in part on the comparing.

T. A system according to one of example R or example S, wherein the reference surface is substantially opaque and limits a detection angle of the LIDAR sensor assembly.

U. A system according to any one of examples R-T, wherein the reference surface comprises a light diffuser.

V. A system according to one of example R or example S, wherein the reference surface is substantially transparent.

W. A system according to any one of examples R-V, wherein the reference surface comprises a portion of the LIDAR sensor assembly.

X. A system according to any one of examples R-V, wherein the reference surface comprises a portion of the vehicle.

Y. A system according to any one of examples R-X, wherein the vehicle comprises an autonomous vehicle.

Z. A system according to any one of examples R-Y, further comprising one or more additional LIDAR sensor assemblies mounted to the vehicle, such that the system includes multiple LIDAR sensor assemblies mounted to the vehicle.

AA. A system according to example Z, wherein the vehicle obstructs a portion of a detection angle of at least one LIDAR sensor assembly of the multiple LIDAR sensor assemblies.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   transmitting a firing signal to a laser light source of a LIDAR sensor assembly to cause the laser light source to emit light toward a reference surface mechanically coupled to the LIDAR sensor assembly, the reference surface being part of a stationary portion of the LIDAR sensor assembly, the stationary portion comprising:
      a first support rib and a second support rib; and
      an elongated spine extending between and coupled to the first support rib and the second support rib, the elongated spine serving as the reference surface;
   wherein the LIDAR sensor assembly further includes a rotatable assembly mechanically coupled to, and rotatable relative to, the stationary portion, the stationary portion configured to remain stationary as the rotatable assembly rotates, the rotatable assembly comprising:
      an elongated chassis having an axis of rotation about which the rotatable assembly is rotatable, wherein the first support rib is coupled to a first end of the elongated chassis and the second support rib is coupled to a second end of the elongated chassis;
   receiving a signal from a light sensor of the LIDAR sensor assembly; and
   detecting, based at least in part on the received signal, reflected light corresponding to reflection of the emitted light from the reference surface.

2. The method of claim 1, further comprising causing rotation of the rotatable assembly about the axis of rotation.

3. The method of claim 2, further comprising repeating the transmitting, the receiving, and the detecting at least once per revolution of the rotatable assembly.

4. The method of claim 2, wherein the transmitting, the receiving, and the detecting are performed responsive to a triggering event.

5. The method of claim 1, wherein the elongated spine comprises a mount for mounting the LIDAR sensor assembly to a vehicle.

6. A LIDAR sensor assembly comprising:
   a rotatable assembly comprising:
      a chassis having an axis of rotation about which the rotatable assembly is rotatable;
      a light source to emit light;
      a light sensor configured to produce a light signal in response to sensing reflected light corresponding to reflection of the light emitted by the light source; and
   a stationary portion to which the rotatable assembly is mechanically coupled, the rotatable assembly being rotatable through an angle of 360 degrees relative to the stationary portion, the stationary portion having an opaque surface disposed in at least a portion of a path of the light source and configured to remain stationary as the rotatable assembly rotates, wherein the stationary portion comprises:
      a first support coupled to a first end of the chassis;
      a second support coupled to a second end of the chassis; and
      an elongated member extending between and coupled to the first support and the second support, wherein:
         the elongated member serves as the opaque surface; and
         the elongated member is substantially parallel to the axis of rotation of the chassis;
   a controller communicatively coupled to the light source and the light sensor, the controller being operative to:
      transmit a firing signal to the light source to cause the light source to emit light; and
      receive a signal from the light sensor.

7. The LIDAR sensor assembly of claim 6, wherein the opaque surface comprises a light diffuser.

8. The LIDAR sensor assembly of claim 6, further comprising a mount for mounting the LIDAR sensor assembly, wherein the opaque surface comprises at least a portion of the mount.

9. The LIDAR sensor assembly of claim 6, wherein the elongated member comprises a mount for mounting the LIDAR sensor assembly to a vehicle.

10. The LIDAR sensor assembly of claim 6, wherein the stationary portion comprises a housing at least partially enclosing the rotatable assembly, the housing including a ring lens at least partially encircling a portion of the rotatable assembly.

11. The LIDAR sensor assembly of claim 6, further comprising an outer housing at least partially enclosing the rotatable assembly, the outer housing comprising:
   a cap;
   a main body; and
   a ring lens interposed between the cap and the main body.

12. The LIDAR sensor assembly of claim 11, further comprising one or more trim pieces disposed between the ring lens and the opaque surface.

13. A LIDAR sensor assembly comprising:
   a rotatable assembly comprising:
      a chassis having an axis of rotation about which the rotatable assembly is rotatable;
      a light source to emit light; and
      a light sensor configured to produce a light signal in response to sensing reflected light corresponding to reflection of the light emitted by the light source;
   a stationary portion to which the rotatable assembly is mechanically coupled, the rotatable assembly being rotatable through an angle of 360 degrees relative to the stationary portion, the stationary portion having an opaque surface disposed in at least a portion of a path of the light source and configured to remain stationary as the rotatable assembly rotates, wherein the stationary portion comprises a housing at least partially enclosing the rotatable assembly, the housing including a ring lens at least partially encircling a portion of the rotatable assembly; and
   a controller communicatively coupled to the light source and the light sensor, the controller being operative to:
      transmit a firing signal to the light source to cause the light source to emit light; and
      receive a signal from the light sensor.

14. The LIDAR sensor assembly of claim 13, wherein the opaque surface comprises a light diffuser.

15. The LIDAR sensor assembly of claim 13, further comprising a mount for mounting the LIDAR sensor assembly, wherein the opaque surface comprises at least a portion of the mount.

16. The LIDAR sensor assembly of claim 13, wherein the stationary portion comprises:
   a first support coupled to a first end of the chassis;
   a second support coupled to a second end of the chassis; and
   an elongated member extending between and coupled to the first support and the second support; and
   wherein the elongated member serves as the opaque surface.

17. The LIDAR sensor assembly of claim 16, wherein the elongated member is substantially parallel to the axis of rotation of the chassis.

18. The LIDAR sensor assembly of claim 16, wherein the elongated member comprises a mount for mounting the LIDAR sensor assembly to a vehicle.

19. The LIDAR sensor assembly of claim 13, further comprising an outer housing at least partially enclosing the rotatable assembly, the outer housing comprising:
   a cap;
   a main body; and
   the ring lens interposed between the cap and the main body.

20. The LIDAR sensor assembly of claim 19, further comprising one or more trim pieces disposed between the ring lens and the opaque surface.

* * * * *